Oct. 19, 1943.   C. R. DENNIS   2,332,307
CUTTER
Filed May 13, 1942
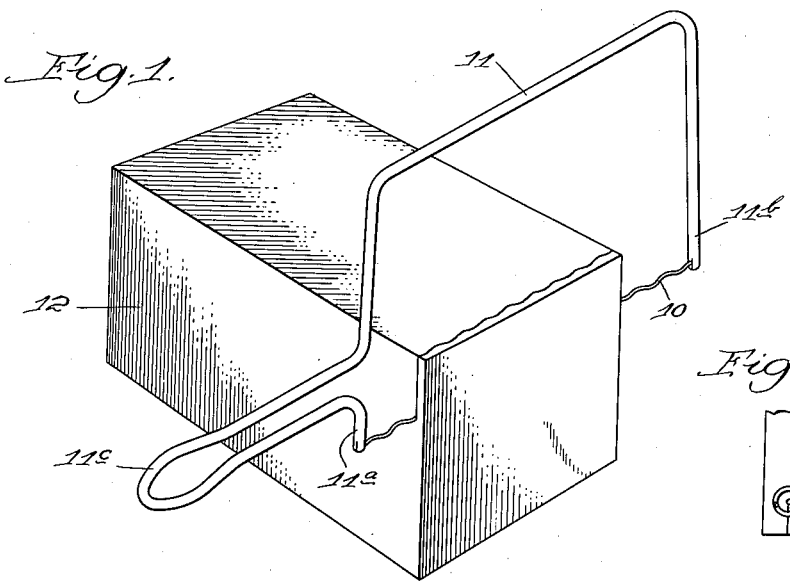
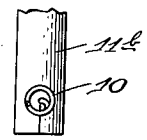
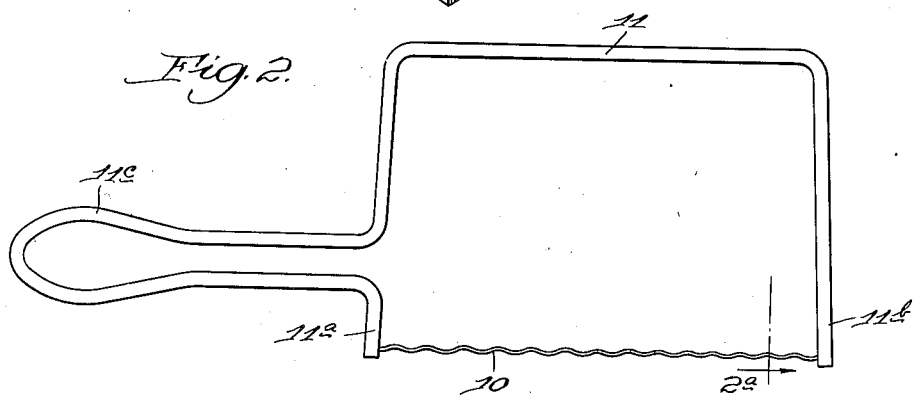
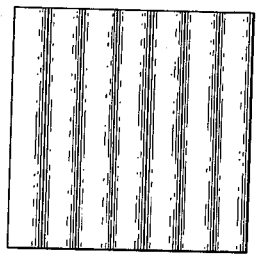 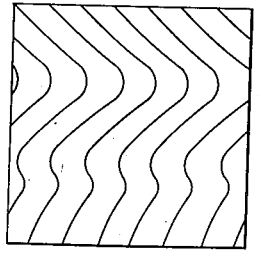 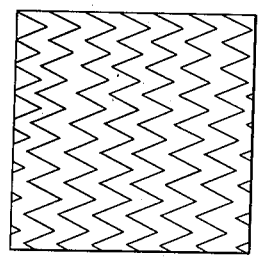
Inventor:
Charles R. Dennis.
By Chritton, Wiles, Davis and Hirschl.
Attys.

Patented Oct. 19, 1943

2,332,307

UNITED STATES PATENT OFFICE 2,332,307

CUTTER

Charles R. Dennis, Brookfield, Ill.

Application May 13, 1942, Serial No. 442,753

6 Claims. (Cl. 30—116)

This invention relates to a cutter, and more particularly to an improved device for cutting soft material, wherein the cutting element is a non-linear wire.

One feature of this invention is that it is particularly adapted for cutting slices of soft material, representative examples of such material being cheese, butter and jelly molds; another feature of this invention is that the cutting element is a non-linear wire, so that the cut is not in a single plane; still another feature of this invention is that the cutting element is adapted to be used with any conventional type of frame or holder; yet another feature of this invention is that cutting may be accomplished during variations in the position or plane of the holder, it being in fact desirable to vary the angle of the holder or move it in directions other than that normal to the cutter element, to secure different surface effects on the slices being cut off from a larger body of the material; a further feature of this invention is that slices of soft material, as food stuff, can be given pleasing and infinitely varying surface effects; still a further feature of this invention is that slices formed with a cutter embodying my invention can be piled on one another with a minimum of sticking; other features and advantages of this invention will be apparent from the following specification and the drawing, in which:

Figure 1 is a perspective view of a loaf of cheese being sliced with a cutter embodying my invention; Figure 2 is an elevational view of the cutter; Figure 2a is a fragmentary transverse sectional view along the line 2a of Figure 2; Figure 3 is a plan view of a slice of cheese with one kind of surface effect, straight parallel grooves formed by moving the cutting element straight down without any other component of movement; Figure 4 is a plan view of another slice of cheese, showing a wavy surface effect of the kind formed by moving the cutting element along its axis and back again in an irregular manner during its downward movement; and Figure 5 is a plan view of another slice of cheese showing what may be termed a zigzag surface effect, formed by moving the cutting element back and forth along the direction of its axis in short quick regular strokes during its downward movement.

There are many kinds of soft materials which are initially formed into large, fairly regular masses and subsequently cut into smaller masses or thin slices, foods such as cheese and butter being common and representative examples. Such cutting has heretofore generally been effected with a knife or with a cutting element in the form of a straight wire. My invention contemplates a cutting element in the form of a non-linear wire, preferably a wire regularly bent or curved in more than one plane. In the preferred embodiment of my invention the wire is formed in an elongated helix with the spacing between turns of the helix being greater than the diameter of the turns.

I am aware that many circular cutters have heretofore been formed with zigzag or undulating edges, as cooky cutters, and that various generally straight blades have been formed with serrated or undulating edges, as slicing knives. To the best of my knowledge, however, no cutting element has heretofore been made regularly non-linear in more than one plane, and more specifically, no cutting wire has been made helical.

The form of cutting element which I am here disclosing and claiming has considerable advantage over those heretofore known in the prior art in that it can be used to make an almost infinite variety of surface effects on the slices. Previous serrated or undulating knives provide a surface pattern, rather than a smooth surface, but this pattern was unvarying and fixed. My cutter can provide a similar fixed pattern if the cut is always straight down, with no other movement of the cutting element. It goes farther than previous cutters in that it can provide a great variety of different surface effects by changing the plane of the cutter or moving the cutting element axially in various ways during the cutting operation.

In the particular embodiment of my invention illustrated herewith the cutting element, identified as 10, will be seen to comprise a wire formed in an elongated helix, the turns being stretched out until the spacing between turns is preferably two or three times the diameter of the turns. The helix is a regular one, and may be formed by winding spring steel wire about an appropriate mandrel, of greater diameter than that eventually desired, and by putting the wire under tension or strain. This is here shown as being accomplished by fastening the wire appropriately between spaced portions 11a and 11b of a frame or holder identified in general as 11, this holder also being provided with a handle identified as 11c. Since the cutting element or wire 10 is placed under considerable tension between the ends 11a and 11b of the frame, it is able to slice through soft material, as the cheese 12 illustrated, without any substantial deformation.

Figures 3, 4 and 5 are illustrative of only three of the almost infinite number of various pleasing surface effects which can be secured with my cutter. The effect of Figure 3 has been secured by moving the cutting element straight down through the cheese without any other movement. The effect of Figure 4 is secured by a sort of wandering or irregular sweeping movement of the cutter, back and forth along the axis of the cutting element, during the cutting operation. Figure 5 is an effect which results from regular periodic short back and forth movements of the cutter during its downward movement. Not only can the cutter be moved back and forth along the axis of the cutting element, but it can be rotated about this axis, and all of these movements or any combination of them can be used to achieve various surface effects, since the cutting element is operative regardless of the position of the cutter.

The cutter is not only an improvement over previous cutters in that it provides various surface effects, but also in that the surface thus formed is not plain, but irregular, so that slices of the material have only relatively small area in contact and sticking is minimized. In a food such as cheese, for example, smooth slices stacked upon one another for an evening supper stick together very seriously, and it is an unpleasant task to separate them at the table. Slices of cheese made with my cutter can be piled on one another vertically, or laid over one another around a cheese plate, with no noticeable sticking, and the same is of course true of other materials which might be sliced, as a jello mold.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A cutter of the character described, comprising a cutting element of wire, said cutting element being regularly curved in more than one plane.

2. A cutter of the character described, comprising a cutting element of wire, said cutting element being in the shape of an elongated helix.

3. A cutter of the character described in claim 2, wherein the spacing between turns of the helix is greater than the diameter of the turns.

4. Apparatus of the character described for cutting soft material, including: a frame having spaced portions; and a cutting element formed of wire stretched between said portions, said cutting element being regularly curved in more than one plane.

5. Apparatus of the character described for cutting soft material, including: a frame having spaced portions; and a cutting element formed of wire stretched between said portions, said cutting element being in the shape of an elongated helix.

6. Apparatus of the character described in claim 5, wherein the spacing between turns of the helix is greater than the diameter of the turns.

CHARLES R. DENNIS.